US012616864B2

(12) United States Patent
Lagree et al.

(10) Patent No.: US 12,616,864 B2
(45) Date of Patent: *May 5, 2026

(54) FORCE ASSISTANCE SYSTEM FOR AN EXERCISE MACHINE

(71) Applicant: Lagree Technologies, Inc., Chatsworth, CA (US)

(72) Inventors: Sebastien Anthony Louis Lagree, Chatsworth, CA (US); Michael Hernandez, Chatsworth, CA (US); Darvin E. Morales, Chatsworth, CA (US); Jose L. Uribina, Chatsworth, CA (US); Max E. Wunderlich, Los Angeles, CA (US)

(73) Assignee: Lagree Technologies, Inc., Chatsworth (CA)

( * ) Notice: Subject to any disclaimer, the term of this patent is extended or adjusted under 35 U.S.C. 154(b) by 142 days.

This patent is subject to a terminal disclaimer.

(21) Appl. No.: 18/754,288

(22) Filed: Jun. 26, 2024

(65) Prior Publication Data

US 2024/0342535 A1 Oct. 17, 2024

Related U.S. Application Data

(63) Continuation of application No. 17/333,332, filed on May 28, 2021, now Pat. No. 12,023,537.

(51) Int. Cl.

| | |
|---|---|
| ***A63B 21/00*** | (2006.01) |
| ***A61H 1/02*** | (2006.01) |
| ***A63B 21/06*** | (2006.01) |

(52) U.S. Cl.

CPC ..... *A63B 21/00181* (2013.01); *A61H 1/0274* (2013.01); *A61H 2201/1261* (2013.01); *A61H 2201/1664* (2013.01); *A63B 21/0615* (2013.01)

(58) Field of Classification Search

CPC .......... A63B 21/00181; A63B 21/0615; A63B 26/003; A63B 21/4019; A63B 21/0442;

(Continued)

(56) References Cited

U.S. PATENT DOCUMENTS 3,640,529 A * 2/1972 Kane .................... A63B 21/023 482/130
3,866,914 A * 2/1975 Jackson ............. A63B 21/0609 473/438

(Continued)

*Primary Examiner* — Garrett K Atkinson
(74) *Attorney, Agent, or Firm* — Neustel Law Offices

(57) ABSTRACT

A force assistance system for an exercise machine assists a user during a first portion of a lift. The force assistance system provides an assistance force at the beginning of a lift to help the user perform the lift. The assistance force reduces the amount of force the user must provide to start the lift. The assistance force helps the user exercise using higher weights for better muscle development. The force assistance system for the exercise machine generally includes an upper member, a lower member and at least one resilient member positioned between the upper member and the lower member. The upper member, the lower member and the at least one resilient member are adapted to be positioned between a frame and a movable arm of the exercise machine. The at least one resilient member applies the assistance force in an upward direction to the movable arm to help the user move the movable arm during a first portion of a lift.

20 Claims, 13 Drawing Sheets

(58) Field of Classification Search
CPC .......... A63B 23/03525; A63B 23/1236; A63B 22/18; A63B 21/4034; A63B 69/16; A63B 21/4035; A63B 22/16; A63B 21/023; A61H 1/0274; A61H 2201/1261; A61H 2201/1664
See application file for complete search history.

(56) References Cited

U.S. PATENT DOCUMENTS

| | | | | | |
|---|---|---|---|---|---|
| 3,888,481 | A * | 6/1975 | Adams, Jr. | A63B 69/00 | 434/247 |
| 4,688,792 | A * | 8/1987 | Rivkin | A63B 21/0628 | 482/90 |
| 5,062,629 | A * | 11/1991 | Vaughan | A63B 22/18 | 482/51 |
| 5,143,372 | A * | 9/1992 | Wilson | A63B 21/0615 | 482/133 |
| 5,352,176 | A * | 10/1994 | Huang | A63B 21/0004 | 482/130 |
| 5,590,930 | A * | 1/1997 | Glockl | A47C 3/0257 | 297/440.1 |
| 6,280,351 | B1 * | 8/2001 | Wong | A63B 69/322 | 273/374 |
| 6,705,977 | B1 * | 3/2004 | Ziak | A63B 22/18 | 482/79 |
| 7,476,188 | B2 * | 1/2009 | Perez, Jr. | A63B 23/0211 | 482/142 |
| 7,645,221 | B1 * | 1/2010 | Curry | A63B 26/003 | 482/79 |
| 7,806,807 | B2 * | 10/2010 | Genua | A63B 21/0004 | 482/79 |
| 8,663,075 | B2 * | 3/2014 | Reyes | A63B 23/0405 | 482/92 |
| 9,248,337 | B1 * | 2/2016 | Humphrey | A63B 21/00181 | |
| 10,245,461 | B2 * | 4/2019 | Bruni | A63B 21/0783 | |
| 10,376,437 | B2 * | 8/2019 | Talton | A61H 3/04 | |
| 10,493,309 | B2 * | 12/2019 | Jue | A63B 21/00069 | |
| 2009/0230743 | A1 * | 9/2009 | Derakhshan | A47C 9/002 | 297/329 |
| 2009/0318274 | A1 * | 12/2009 | Welsh | A63B 26/003 | 482/142 |
| 2016/0001119 | A1 * | 1/2016 | Jue | A63B 21/00069 | 482/54 |
| 2018/0177673 | A1 * | 6/2018 | Talton | A61H 3/04 | |

* cited by examiner

FORCE ASSISTANCE SYSTEM FOR AN EXERCISE MACHINE

CROSS REFERENCE TO RELATED APPLICATIONS

The present application is a continuation of U.S. application Ser. No. 17/333,332 filed on May 28, 2021. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

Example embodiments in general relate to a force assistance system for an exercise machine for providing a force at the beginning of a lift to assist the user perform the lift.

Exercise machines provide a source of resistance for a user to work against to exercise their muscles. In particular, an exercise machine uses the mass of a weight to provide resistance. The user exercises their muscles by lifting the weight. The mass of the weight is constant during the time it is lifted by the user, so the user must exert a constant amount of force from the beginning to the end of the lift to move the weight.

However, strengthening fast twitch muscles requires a user to work with higher amounts of (e.g., heavier) weight. When the amount of weight is increased, many users struggle or fail during the first part of a lift, but once started can complete the lift. Users seeking to develop fast twitch muscle could benefit from a system that assists the user during the first portion of a lift by reducing the amount of force required from the user to lift the weight.

SUMMARY

An example embodiment of the present disclosure is related to a force assistance system for an exercise machine. An example embodiment of the present disclosure generally includes a force assistance system that provides an assistance force to assist a user while performing lifts on the exercise machine. The force assistance system provides the assistance force during a first portion of a lift. The assistance force reduces the amount of force the user must exert at the beginning of a lift to perform the lift. So, at the beginning of a lift, the weight as built by the user seems lighter because the force assistance system the assistance force to help lift the weight. Providing assistance at the beginning of the left, helps a user to exercise using heavier weights. The assistance force reduces the amount of weight the user must lift at the beginning of the lift, so the weight felt by the user is within the range of the lifter's physical capabilities. By the time the force assistance system no longer assists, the user has enough momentum to finish the lift on their own (e.g., without assistance) even though the weight is heavier than they normally lift.

There has thus been outlined, rather broadly, some of the embodiments of the force assistance system for an exercise machine in order that the detailed description thereof may be better understood, and in order that the present contribution to the art may be better appreciated. There are additional embodiments of the force assistance system for an exercise machine that will be described hereinafter and that will form the subject matter of the claims appended hereto. In this respect, before explaining at least one embodiment of the force assistance system for an exercise machine in detail, it is to be understood that the force assistance system for an exercise machine is not limited in its application to the details of construction or to the arrangements of the components set forth in the following description or illustrated in the drawings. The force assistance system for an exercise machine is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
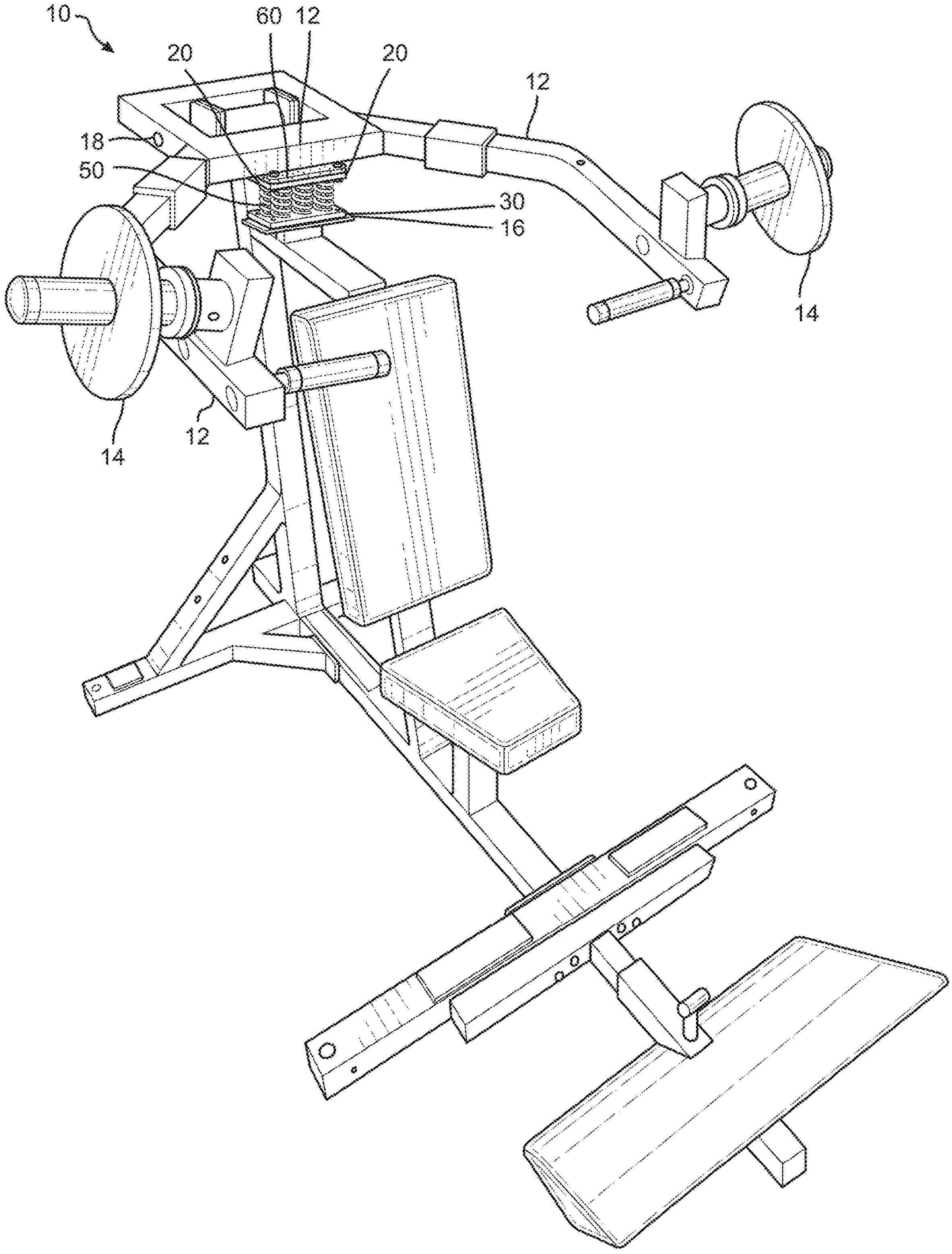
FIG. 1 is a perspective view of a force assistance system for an exercise machine in accordance with an example embodiment.
Figure 2:
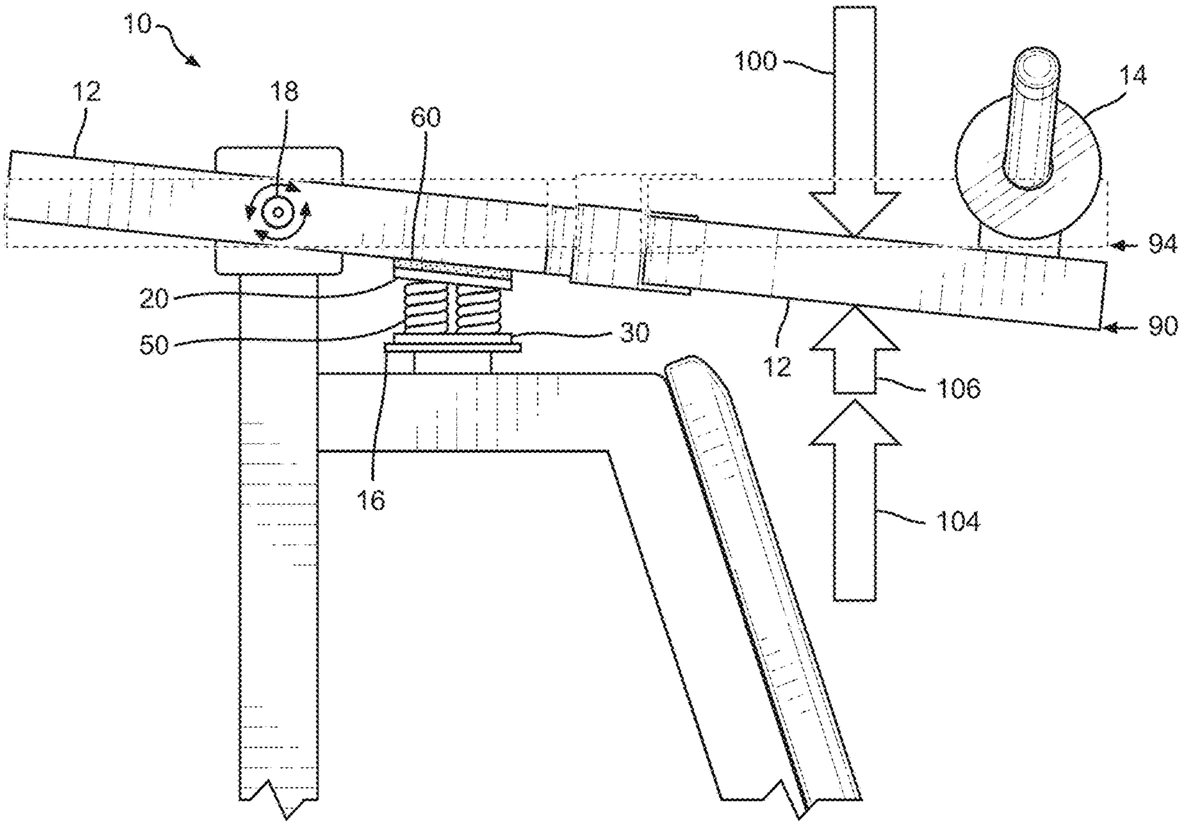
FIG. 2 is a side view of the example embodiment in the compressed position.
Figure 3:
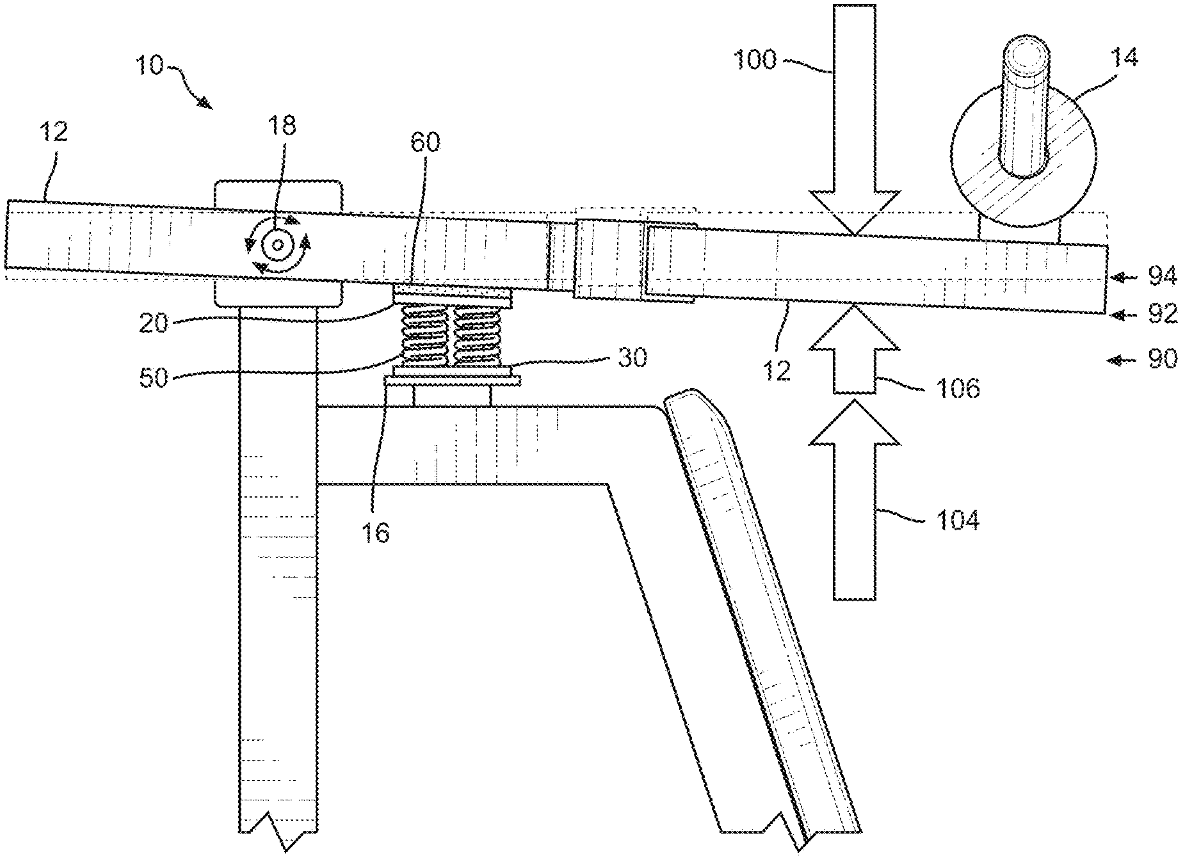
FIG. 3 is a side view of the example embodiment in the intermediate position.
Figure 4:
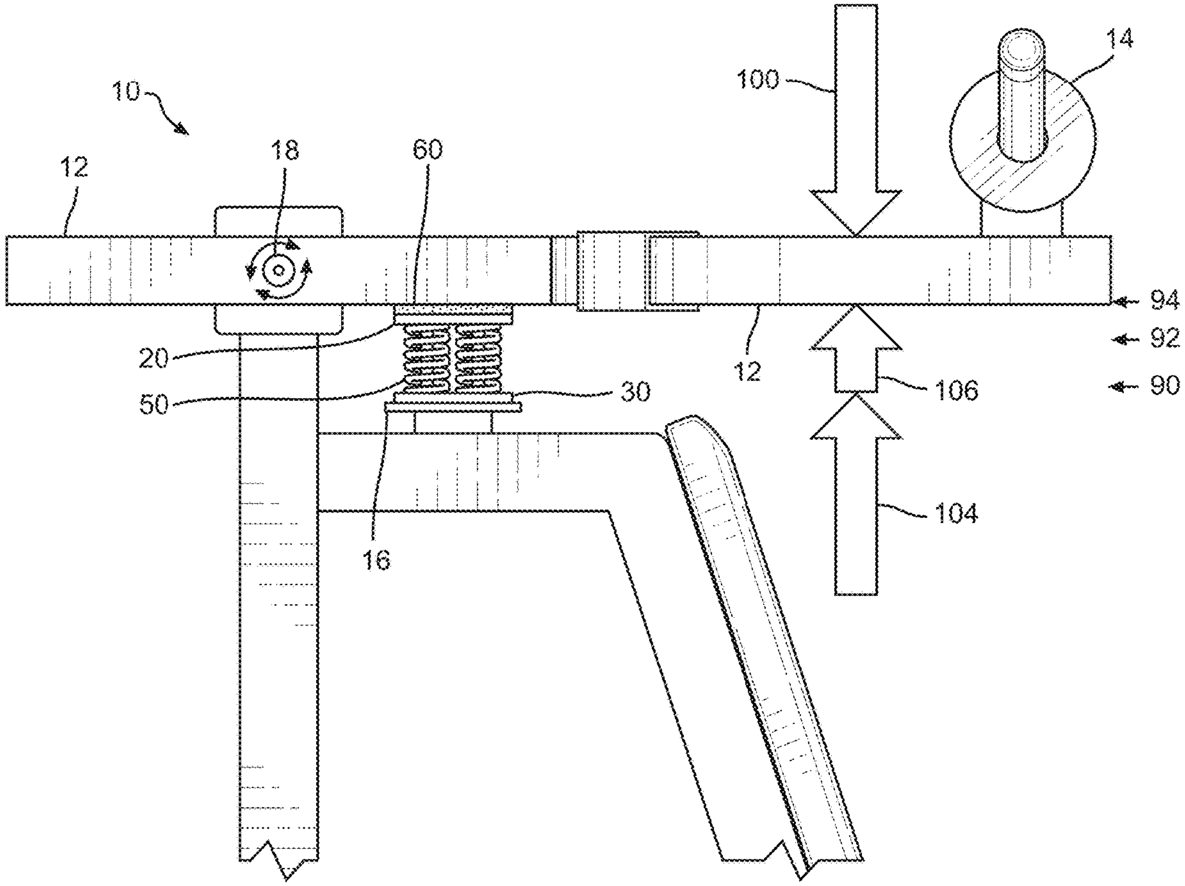
FIG. 4 is a side view of the example embodiment in the contact position.
Figure 5:
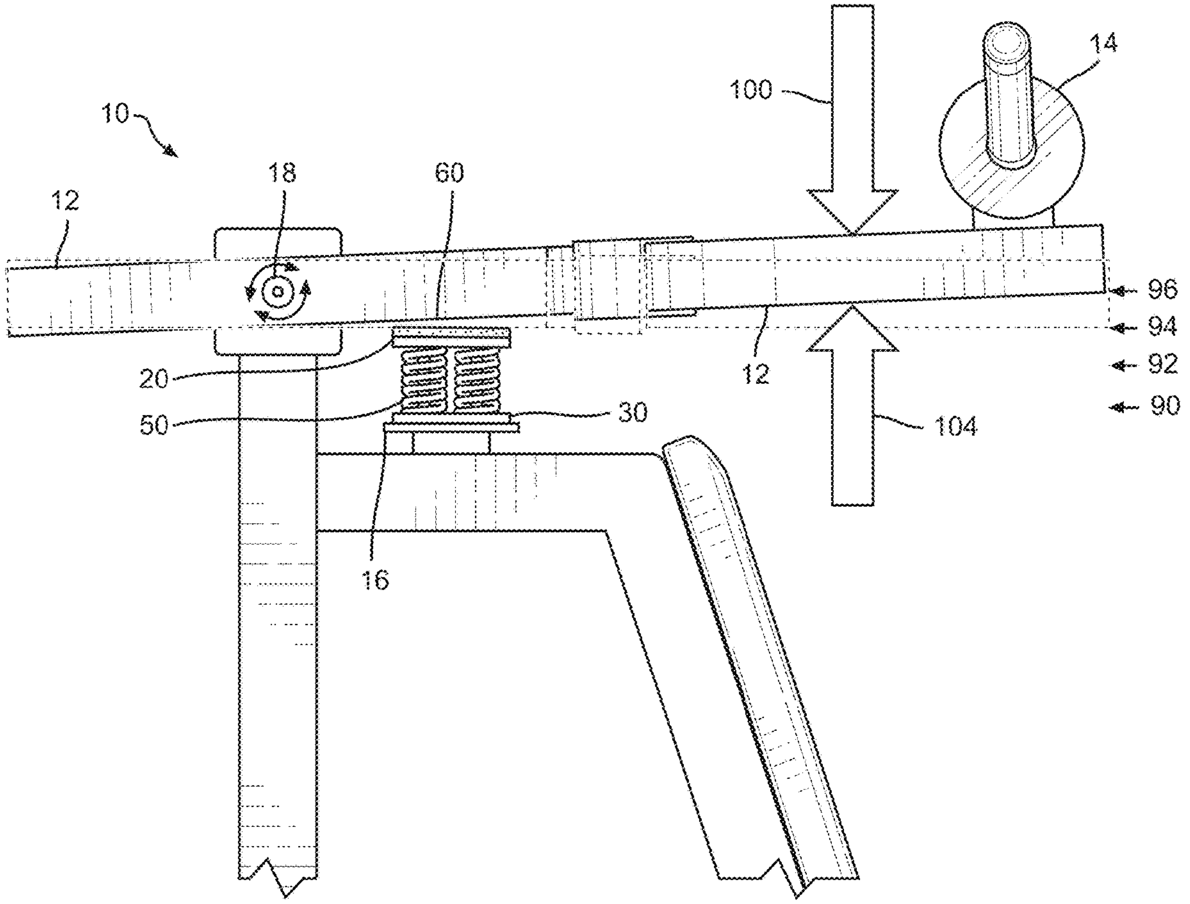
FIG. 5 is a is a side view of the example embodiment in the beyond position.
Figure 6:
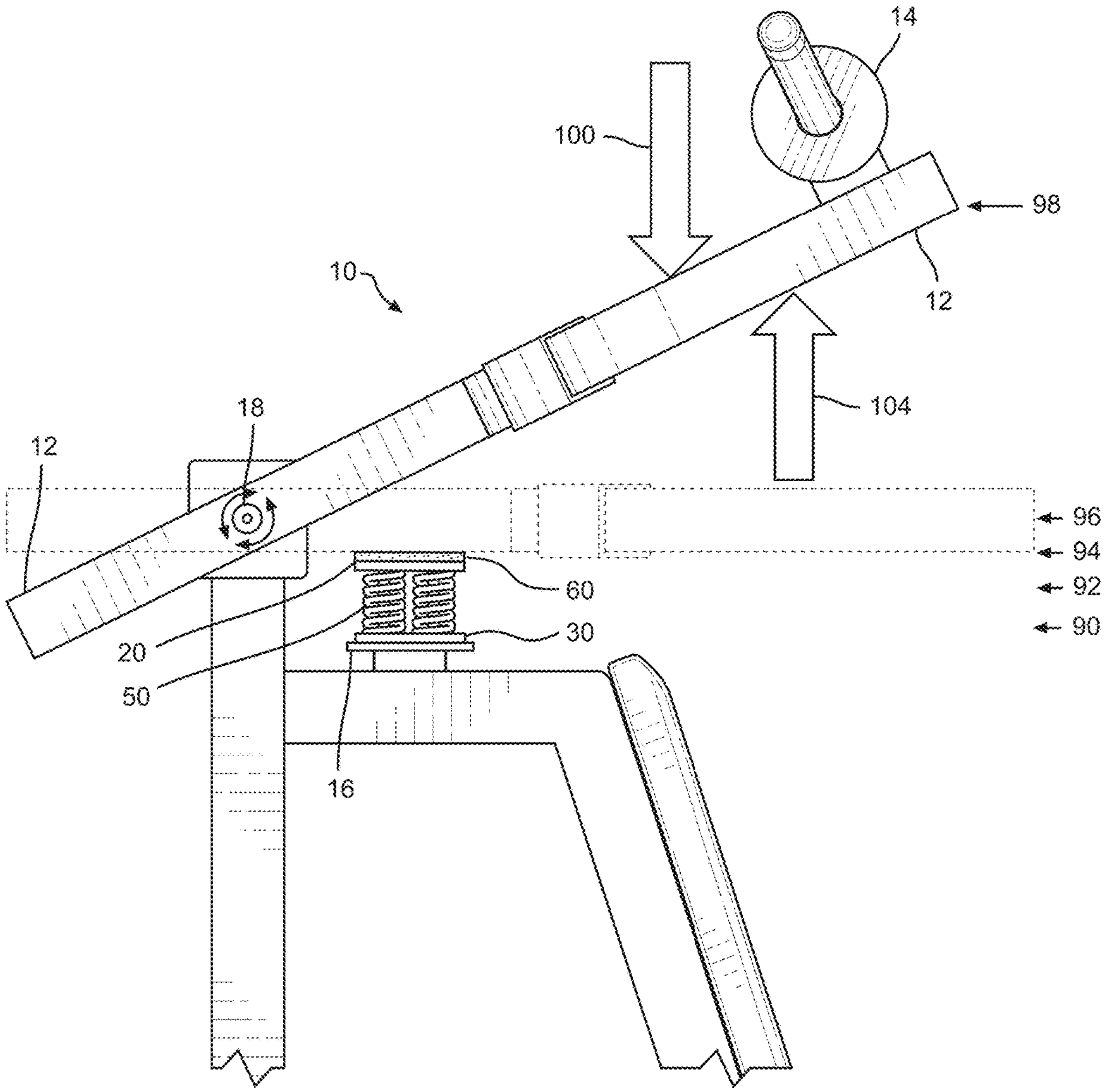
FIG. 6 is a is a side view of the example embodiment in the contact position while the movable arm of the exercise machine is in the lifted position.

A user of an exercise machine 10, as best shown in FIGS. 1-6, moves the movable arm of the exercise machine 10 with respect to the frame 16 of the exercise machine 10 while performing muscle strengthening exercises. Generally, a weight 14 is coupled to the movable arm 12, so the mass of the weight 14 and the mass of the movable arm 12 provide a weight force 100 against which the user exerts a user force 104 for muscle strengthening.

In an embodiment, the weight force 100 operates in a downward direction, so the user applies the user force 104 in an upward direction. To strengthen muscles, the user applies a user force 104 that is greater than the weight force

100 to move (e.g., lift, push) the movable arm 12 upward to a lifted position 98, which is the uppermost (e.g., highest, farthest) position to which the user moves the movable arm 12. After the movable arm 12 reaches the lifted position 98, the user either decreases or stops applying the user force 104 altogether, so the movable arm 12 moves downward due to the weight force 100. The user repeatedly performs the lift.

However, a user could benefit from an assistance force 106 that reduces the amount of user force 104 required during the beginning (e.g., first) portion of a lift. An assistance force 106 is applied in an upward direction on the movable arm 12 in addition to the user force 104, so at the beginning of a lift, the user can exert less user force 104 to move the movable arm 12. The assistance force 106 enables the user to use a heavier weight 14. The assistance force 106 helps the user to move the weight at the beginning of the lift. After the first portion of the lift, the assistance force drops to zero; however, the user has created sufficient momentum in the movement of movable arm 12 to be able to finish the lift with the user force 104 alone. Using a heavier weight 14 increases the strength of fast twitch muscles. The force assistance system provides the assistance force 106 at the beginning of a lift to assist the user.

An example embodiment of a force assistance system for an exercise machine 10 generally comprises an upper member 20, a lower member 30, and at least one resilient member 50. The lower member 30 is adapted to rest on the frame 16 of the exercise machine 10. The upper member 20 is adapted to contact the movable arm 12 during the beginning portion of a lift. The at least one resilient member 50 is positioned between the upper member 20 and the lower member 30, so the upper member 20, the at least one resilient member 50, and the lower member 30 are all positioned between the frame 16 and the movable arm 12.

At the beginning of a lift, the movable arm 12 is in contact with the upper member 20 and the weight force 100 presses the upper member 20 in a downward direction toward a compressed position 90. In the compressed position 90, the at least one resilient member 50 is compressed and applies the assistance force 106 to the movable arm 12 in an upward direction via the upper member 20. As the user applies the user force 104 against the movable arm 12 in the upward direction. The assistance force 106 in combination with the user force 104 pushes against (e.g., opposite) the weight force 100 to move the movable arm 12 in the upward direction. After the beginning portion of the lift, the movable arm 12 ceases to contact the upper member 20 and the at least one resilient member 50 ceases to apply the assistance force 106 on the arm member. The position at which the movable arm 12 ceases to contact the upper member 20 is referred to as the contact position 94. Once the movable arm 12 moves past the contact position 94, the force assistance system provides no assistance force 106 and the user force 104 must increase to move the movable arm 12 to the lifted position 98. So, the assistance force 106 reduces the amount of user force 104 required to move the movable arm 12 in the upward direction during the beginning portion of a lift.

B. Upper Member

A force assistance system includes an upper member 20. The upper member 20, as best shown in FIGS. 2-6, moves with respect to the lower member 30 between a compressed position 90 and a contact position 94. In the compressed position 90, the upper member 20 is proximate to the lower member 30. In the contact position 94, the upper member 20 is distal to the lower member 30. The upper member 20 moves with respect to the lower member 30 to compress and decompress the at least one resilient member 50.

The upper member 20 is adapted to contact the movable arm 12 of the exercise machine 10. The upper member 20 is adapted to be in contact with the movable arm 12 during a first portion of a lift. The upper member 20 is adapted to be in contact with the movable arm 12 at or between the compressed position 90 and the contact position 94. The upper member 20 is in contact with the movable arm 12 while the upper member 20 is in the compressed position 90 at the beginning of a lift. As the movable arm 12 moves in an upward direction, the upper member 20 leaves the compressed position 90, but remains in contact with the movable arm 12. As the movable arm 12 continues to move in the upward direction, the upper member 20 remains in contact with the movable arm 12 until the upper member 20 reaches the contact position 94. As the movable arm 12 continues to move in the upward direction past the contact position 94, the movable arm 12 ceases to move relative to the lower member 30 and ceases to contact the upper member 20.

While the upper member 20 is at or between the compressed position 90 and the contact position 94, the upper member 20 presses against the at least one resilient member 50 to compress the at least one resilient member 50. While the upper member 20 moves between the compressed position 90 and the contact position 94, the upper member 20 moves with respect to the lower member 30 to compress or decompress the at least one resilient member 50. While the upper member 20 is positioned in the compressed position 90, the at least one resilient member 50 is more compressed. While the upper member 20 is positioned in the contact position 94, the at least one resilient member 50 is less compressed. As the movable arm 12 moves past the compressed position 90, the movable arm 12 ceases to contact the upper member 20 and the upper member 20 remains in the contact position 94.

Prior to the user starting a lift, the weight force 100 of the movable arm 12 presses in a downward direction on the upper member 20 to push the upper member 20 into the compressed position 90. While the upper member 20 is positioned in the compressed position 90, the at least one resilient member 50 applies a force in an upward direction, referred to as the assistance force 106, to the movable arm 12 via (e.g., through) the upper member 20. While the upper member 20 is at or between the compressed position 90 and the contact position 94, the at least one resilient member 50 applies the assistance force 106 to the movable arm 12 via the upper member 20. As the movable arm 12 moves past the contact position 94, the upper plate ceases contact the movable arm 12, so the at least one resilient member 50 cannot apply the assistance force 106 to the movable arm 12. In other words, as the movable arm 12 moves in the upward direction past the contact position 94 with the upper member 20, the movable arm 12 ceases to contact the upper member 20 and the at least one resilient member 50 ceases to apply the assistance force 106 on the movable arm 12.

After the movable arm 12 moves in the upward direction past the contact, it continues to move upward responsive to the user force 104 until it reaches the lifted position 98. Once the movable arm 12 reaches the lifted position 98, the user reduces or discontinues the user force 104, so the weight force 100 moves the arm in a downward direction from the lifted position 98. As the movable arm 12 moves downward, it reaches the contact position 94 and comes into contact with the upper member 20. The weight force 100 presses the movable arm 12 against the upper member 20 to move the upper member 20 from the contact position 94 to the compressed position 90. The weight force 100 continues to press downward on the movable arm 12 to hold (e.g., retain) the upper member 20 in the compressed position 90. The upper member 20 remains in the compressed position 90 until the user applies the user force 104 to move the movable arm 12 upward.

The upper member 20 may be formed of any material. The upper member 20 may have any shape. In an implementation, as best shown in FIGS. 10-16, the upper member 20 is a metal plate. In another implementation, the upper member 20 is formed of plastic. In another implementation, the upper plate is formed of rubber.

Figure 12:
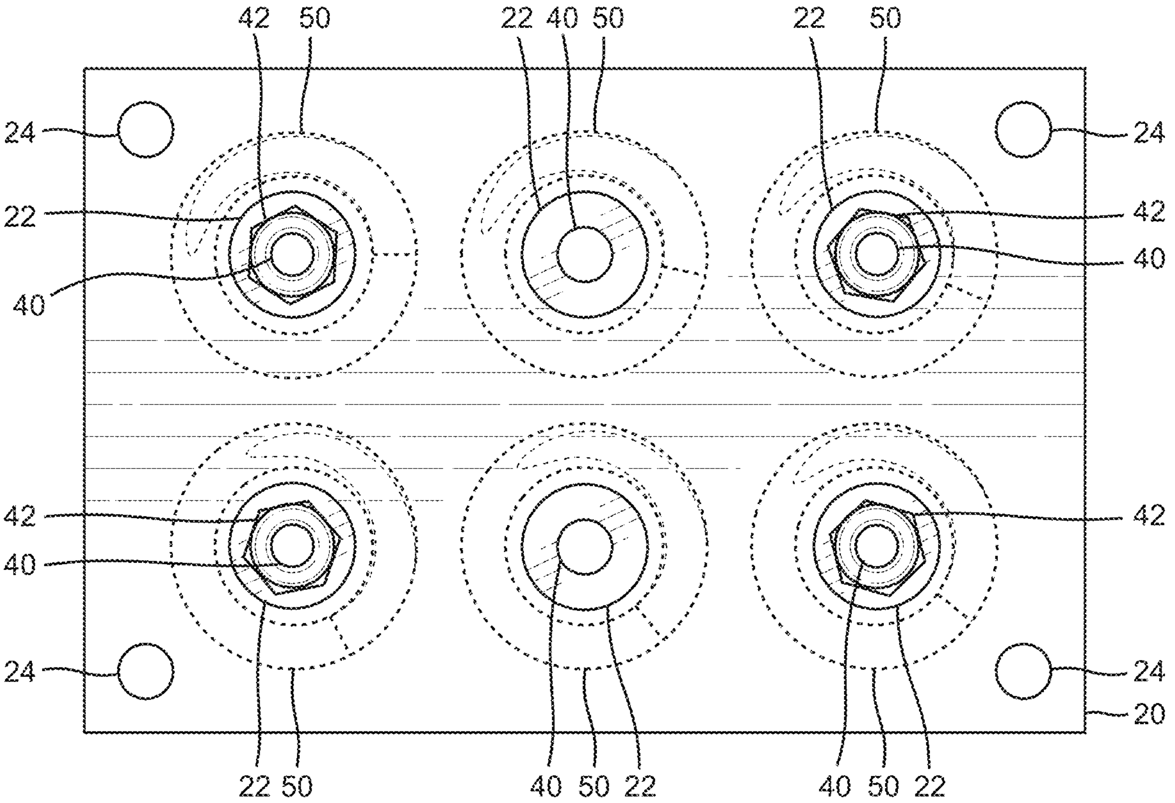
FIG. 12 is a top view of the sample embodiment.
Figure 14:
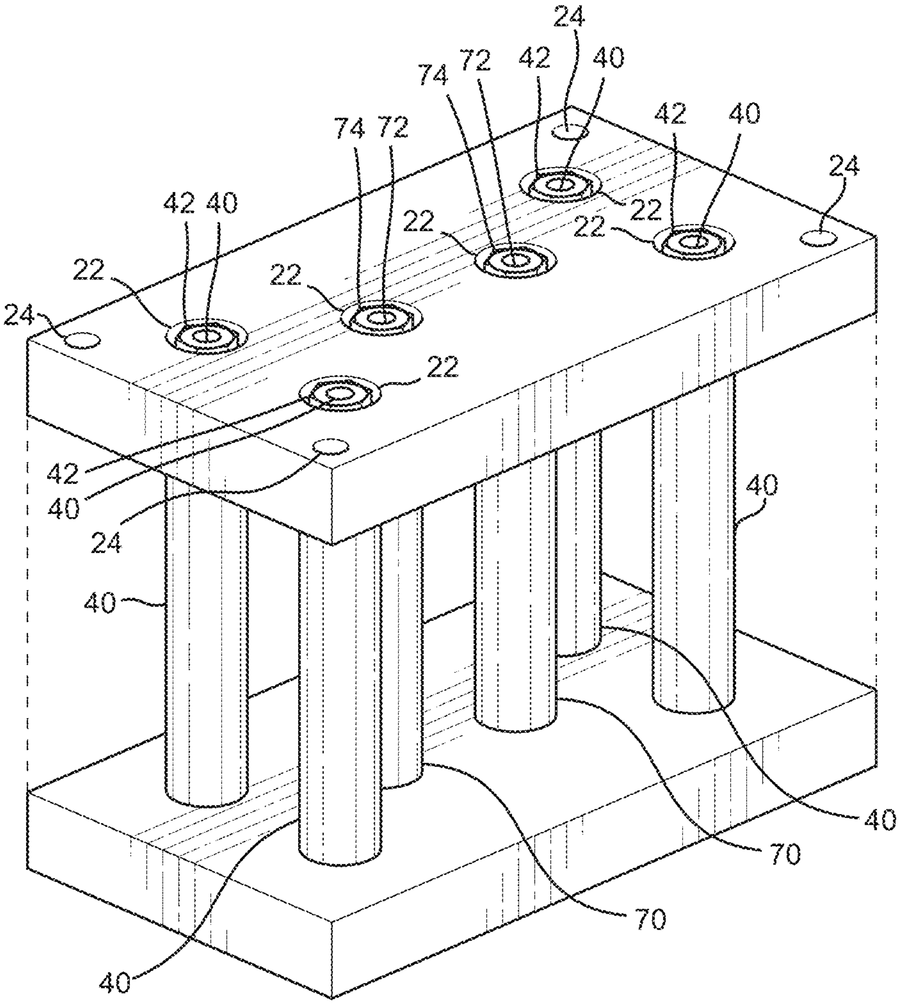
FIG. 14 is a perspective view of a second embodiment of the force assistance system.

The upper member 20 may include any structure for coupling to at least one connecting member 40 and/or a cushion member 60. In an embodiment, as best shown in FIG. 12, the upper member 20 includes one or more holes for coupling to at least one connecting member 40. The upper member 20, as best shown in FIGS. 12 and 14, may further include recess 22. A nut 42 of the at least one connecting member 40 may be positioned in recess 22 so as not to protrude above the upper surface of the upper member 20. A portion of the at least one connecting member 40 may be positioned in recess 22 so as not to protrude above the upper surface of the upper member 20. In another embodiment, as best shown in FIG. 14, a nut 74 of an actuator 70 may be positioned in recess 22 so as not to protrude above the upper surface of the upper member 20. A portion of the actuator 70 or the actuator rod 72 may be positioned in recess 22 so as not to protrude above the upper surface of the upper member 20.

In an embodiment, as best shown in FIG. 12, the upper member 20 may include one or more holes 24 for coupling to the cushion member 60.

The upper member 20 may couple to the at least one resilient member 50.

C. Lower Member

A force assistant system includes a lower member 30. As best shown in FIGS. 2-6 and 12-16, The lower member 30 is adapted to rest on a frame 16 of the exercise machine 10. The lower member 30 remains in contact with the frame 16 of the exercise machine 10. The lower member 30 remains stationary with respect to the frame 16. The lower member 30 remains stationary while the upper member 20 moves with respect to the lower member 30 and the frame 16.

The upper member 20 moves toward and away from the lower member 30. The movable arm 12 moves toward and away from the lower member 30. The lower member 30 remains stationary while the movable arm 12 moves with respect to the lower member 30 and the frame 16. The upper member 20 moves between a compressed position 90 and a contact position 94 with respect to the lower member 30. The upper member 20 moves toward the lower member 30 until the upper member 20 reaches the compressed position 90. A weight force 100 moves the upper member 20 toward and into the compressed position 90 with respect to the lower member 30. The movable arm 12 stops moving toward the lower member 30 when the upper member 20 reaches the compressed position 90. The upper member 20 moves away from the lower member 30 until the upper member 20 reaches the contact position 94.

The user force 104 in combination with the assistance force 106 moves the movable arm 12 upward. As the movable arm 12 moves upward, the assistance force 106 moves the upper member 20 away from the lower member 30. As a movable arm 12 moves upward, the upper member 20 moves away from the lower member 30 until the upper member 20 reaches the contact position 94. As the movable arm 12 moves past the contact position 94, the upper member 20 remains at the contact position 94.

As discussed above, the at least one resilient member 50 is positioned between the lower member 30 and the upper member 20. As the upper member 20 moves with respect to the lower member 30, the lower member 30 provides a surface (e.g., base) against which the upper member 20 compresses and decompresses the at least one resilient member 50. As the upper member 20 moves toward the lower member 30, the upper member 20 compresses the at least one resilient member 50 between the upper member 20 and the lower member 30. As the upper member 20 moves away from the lower member 30, the at least one resilient member 50 decompresses.

The lower member 30 may be formed of any material. The lower member 30 may have any shape. In an implementation, the lower member 30 is a metal plate. In another implementation, the lower member 30 is formed of plastic. In another implementation, the lower plate is formed of rubber.

In an embodiment, the lower member 30 is removably coupled to the frame 16. In another embodiment, as best shown in FIG. 1, the weight of the assistance force system retains the lower member 30 resting on the frame 16.

A lower member 30 may couple to the at least one resilient member 50.

The lower member 30 may include any structure for coupling to at least one connecting member 40. In an embodiment, the lower member 30 includes one or more holes for coupling to the at least one coupling member. The lower member 30 may include structures for coupling to the at least one connecting member 40 that are similar to the structures of the upper member 20. For example, the lower member 30 may include recesses 22.

D. Resilient Member

A force assistant system includes at least one resilient member 50. As best shown in FIGS. 2-6 and 10-15, the at least one resilient member 50 is positioned between the upper member 20 and the lower member 30. The lower member 30, the upper member 20 and the at least one resilient member 50 are adapted to be positioned between the frame 16 and the movable arm 12. As discussed above, the upper member 20 moves with respect to the lower member 30 to compress and decompress the at least one resilient member 50. While the movable arm 12 is in contact with the upper member 20, the upper member 20 moves upward and downward with the movable arm 12 to compress and decompress the at least one resilient member 50. While the movable arm 12 contacts the upper member 20 and moves in the upward direction, the upper member 20 moves in the upward direction with respect to the lower member 30 to decompress the at least one resilient member 50. As the movable arm 12 moves in the downward direction, the movable arm 12 pushes the upper member 20 in the downward direction with respect to the lower member 30 to compress the at least one resilient member 50.

The at least one resilient member 50 provides the assistance force 106. The assistance force 106 assists a user to lift the movable arm 12 during the first portion of a lift. The movable arm 12 applies the weight force 100 against the user and against the upper member 20 and thereby to the at least one resilient member 50. The weight force 100 moves the movable arm 12 in a downward direction from the lift position to the contact position 94. At the contact position 94, the movable arm 12 comes into contact with the upper member 20, which is also positioned at the contact position 94. Contact of the movable arm 12 with the upper member 20 applies the weight force 100 to the upper member 20 and the at least one resilient member 50. Upon contact of the movable arm 12 with the upper member 20, the at least one resilient member 50 applies the assistance force 106 in the upward direction to the movable arm 12. The assistance force 106 opposes the weight force 100. In this example, as is generally the case, the weight force 100 is greater than the assistance force 106. As the weight force 100 moves the movable arm 12 downward from the contact position 94, the movable arm 12 pushes the upper member 20 in the downward direction toward the lower member 30 thereby compressing the at least one resilient member 50. In an embodiment, as the movable arm 12 pushes the upper member 20 in the downward direction, the assistance force 106 applied by the at least one resilient member 50 on the movable arm 12 is increased.

As the weight force 100 on the movable arm 12 continues to move the movable arm 12 in the downward direction, the upper member 20 continues to move closer to the lower member 30 and to further compress the at least one resilient member 50. The movable arm 12 continues to push the upper member 20 downward until the upper member 20 reaches the compressed position 90. In the compressed position 90, the weight force 100 cannot push the upper member 20 any closer to the lower member 30. In an embodiment, as the movable arm 12 pushes the upper member 20 in the downward direction, the movable arm 12 reaches a compressed position 90 in which the assistance force 106 is a maximum. The maximum force provided by the at least one resilient member may be referred to as the maximum assistance force 108.

In an embodiment, while the upper member 20 is at the compressed position 90 or at the contact position 94 or any position in between (e.g., intermediate position 92), the upper member 20 is in contact with the movable arm 12 and the at least one resilient member 50 applies the assistance force 106 to the movable arm 12. As the upper member 20 moves from the contact position 94 to compressed position 90, the assistance force 106 increases because the upper member 20 further compresses the at least one resilient member 50. As the upper member 20 moves from the compressed position 90 to the contact position 94, the assistance force 106 decreases because the upward movement of the upper member 20 with respect to the lower member 30 decompresses the at least one resilient member 50. As soon the movable arm 12 moves past the contact position 94 (e.g., beyond position 96) toward the lifted position 98, the movable arm 12 no longer contacts the upper member 20, so the at least one resilient member 50 cannot apply the assistance force 106 to the movable arm 12. In other words, when the movable arm 12 moves past the contact position 94, the assistance force 106 on the movable arm 12 drops to zero.

The at least one resilient member 50 applies the assistance force 106 in an upward direction to the movable arm 12. The assistance force 106 combines with the user force 104 in the upward direction to move the movable arm 12 upward. When the sum of the assistance force 106 and the user force 104 is greater than the weight force 100, the movable arm 12 moves in the upward direction. When the sum of the assistance force 106 in the user force 104 is less than the weight force 100, the movable arm 12 moves downward. If the sum of the assistance force 106 and the user force 104 is sufficiently small, the weight force 100 moves the movable arm 12 past the contact position 94 to the compressed position 90. When the movable arm 12 moves upward past the contact position 94 toward the lifted position 98, the movable arm 12 no longer contacts the upper member 20 and the assistance force 106 applied to the movable arm 12 is zero. The assistance force 106 reduces the amount of user force 104 required to move the movable arm 12 in the upward direction between the compressed position 90 and the contact position 94, which is the first portion of a lift.

In an embodiment, at least one resilient member 50 is positioned between the upper member 20 and the lower member 30. The lower member 30, the upper member 20 and the at least one resilient member 50 are adapted to be positioned between the frame 16 and the movable arm 12. As the movable arm 12 pushes the upper member 20 in a downward direction, the at least one resilient member 50 applies an assistance force 106 to the movable arm 12 in an upward direction. The assistance force 106 in combination with a user force 104 moves the movable arm 12 in the upward direction, whereby the assistance force 106 reduces the user force 104 required to move the movable arm 12 in the upward direction.

Figure 7:
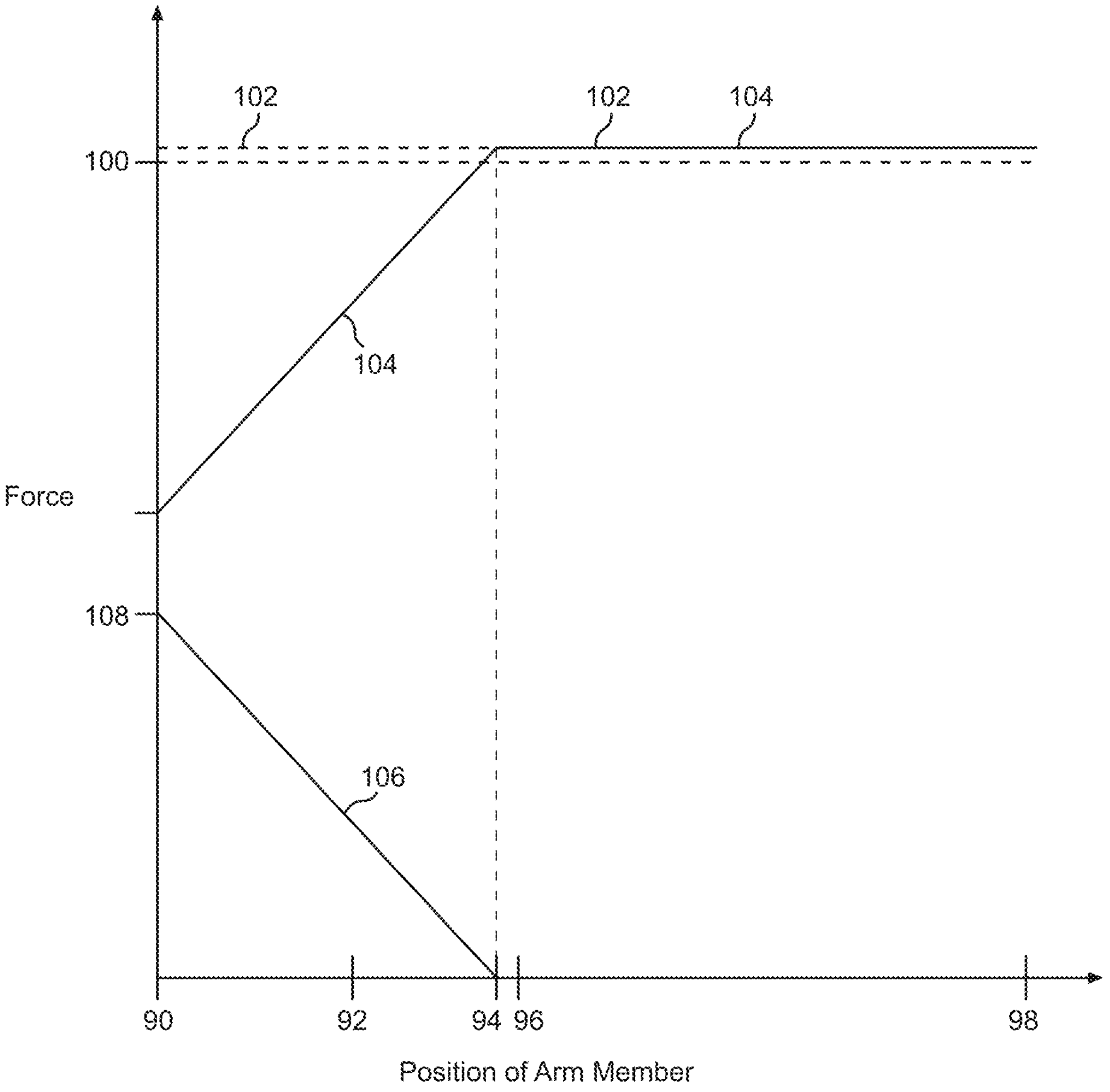
FIGS. 7-9 are diagrams of the assistance force, the user force and the weight force with respect to the compressed position, intermediate position, the contact position, the beyond position and the lifted position.
Figure 8:
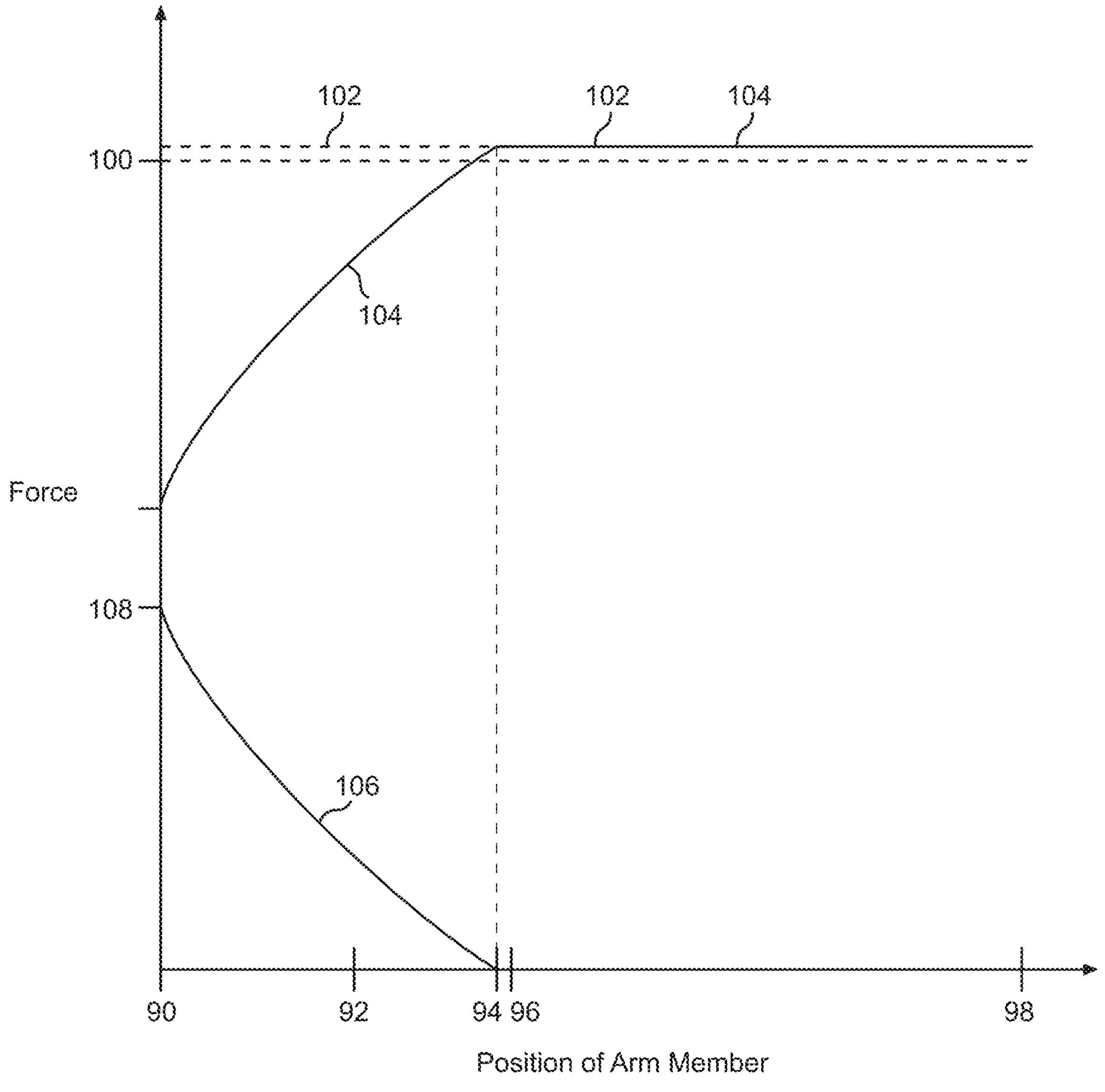
Figure 9:
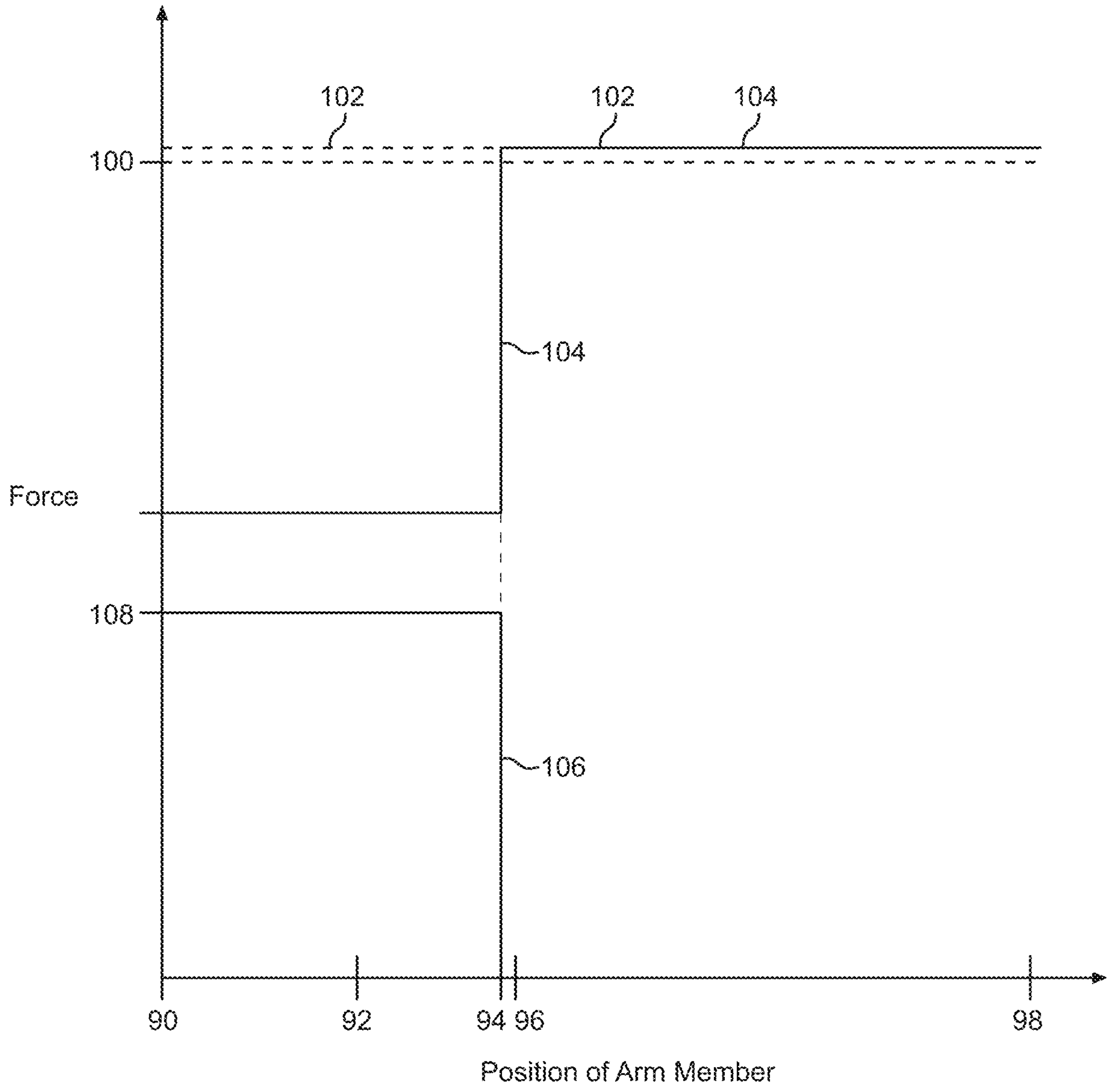

The at least one resilient member 50 may provide any amount of force as the assistance force 106. The at least one resilient member 50 applies the assistance force 106 to the movable arm 12 at or between the compressed position 90 and the contact position 94. The assistance force 106 provided by the at least one resilient member 50 may be constant. An example of the assistance force 106 as a linear force is shown in FIG. 9. The assistance force 106 provided by the at least one resilient member 50 may vary. In an embodiment, the assistance force 106 applied by the at least one resilient member 50 on the movable arm 12 is proportional to a distance traveled by the upper member 20 between a contact position 94, in which the movable arm 12 begins to contact the upper member 20, and a compressed position 90, in which the upper member 20 is positioned at a position closest to the lower member 30. In an embodiment, the assistance force 106 is a linear force. An example of the assistance force 106 as a linear force is shown in FIG. 7. In another embodiment, the assistance force 106 is a non-linear force. An example of the assistance force 106 as a linear force is shown in FIG. 8.

In an embodiment, the at least one resilient member 50 comprises a spring (e.g. compression spring). In another embodiment, the at least one resilient member 50 is comprised of a plurality of springs. While the at least one resilient member 50 is comprised of a spring, the assistance force 106 provided by the spring is linear between the compressed position 90 and the contact position 94.

In another embodiment, the at least one resilient member 50 comprises an actuator 70. An actuator 70 includes any type of actuator including an electromechanical actuator, a pneumatic actuator, a hydraulic actuator and a mechanical actuator. The movement of the actuator may be rotary and/or linear. A linear actuator may include an actuator rod 72 that provides the assistance force 106. The actuator rod 72 may be coupled to the upper member 20 or the lower member 30, while the rest of the actuator 70 (e.g., body) is coupled to the lower member 30 or the upper member 20 respectively. The actuator rod 72 and/or the body of the actuator 70 may couple to the upper member 20 or the lower member 30 in any manner. In an implementation, the actuator rod 72 couples to upper member 20 using nut 74.

An actuator 70, in combination with a processor and sensors to detect the distance between the upper member 20 and the lower member 30, may provide the assistance force 106 as the constant force as shown in FIG. 9.

Figure 15:
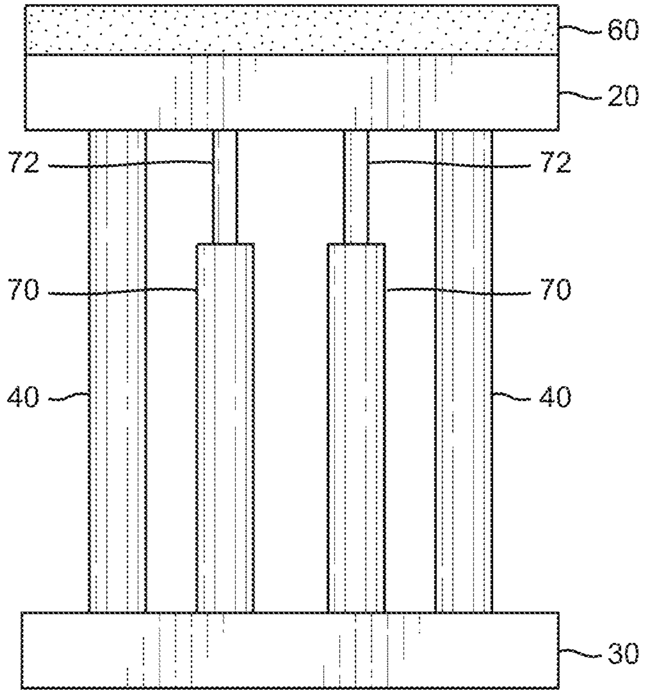
FIG. 15 is a front view of the second embodiment.

In an embodiment, as best shown in FIGS. 15-15, the at least one resilient member 50 is comprised of at least one actuator 70. In an embodiment, the assistance force 106 provided by the at least one actuator 70 is linear. In another embodiment, the assistance force 106 provided by the at least one actuator 70 is non-linear. In another embodiment, the assistance force 106 provided by the at least one actuator 70 as the upper member 20 moves between the compressed position 90 and the contact position 94 is constant. In an embodiment, the at least one resilient member 50 is comprised of a plurality of actuators 70, wherein an actuator rod 72 of each actuator 70 respectively couples to one of the upper member 20 and the lower member 30.

Figure 16:
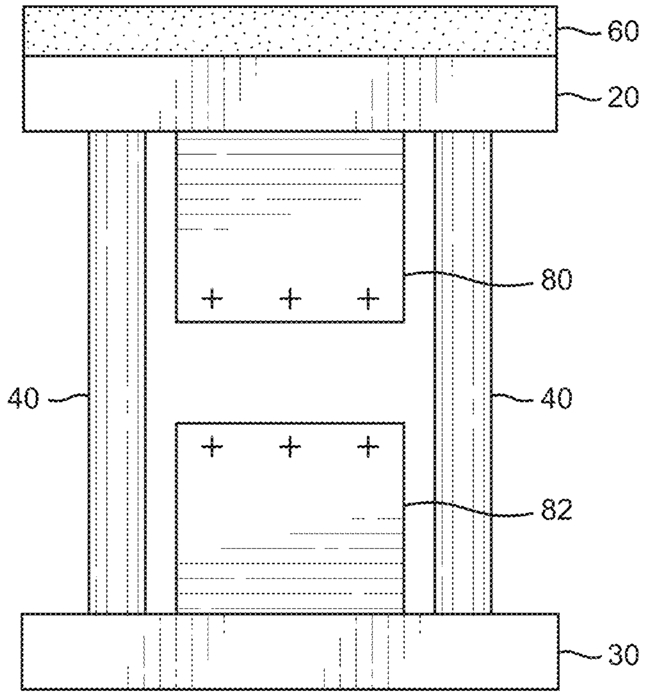
FIG. 16 is a front view of a third embodiment of the force assistance system.

In another embodiment, as best shown in FIG. 16, the at least one resilient member 50 comprises an upper magnet 80 having a first side with a first polarity and a lower magnet 82 having a second side with a second polarity. The upper magnet 80 is coupled to the upper member 20 with the first side oriented toward the lower member 30 and the lower magnet 82 is coupled to the lower member 30 with the second side oriented toward the upper member 20. The first polarity is a same as the second polarity, so a repulsion force between the upper magnet 80 and the lower magnet 82 provides the assistance force 106. The upper magnet 80 and lower magnet 82 may provide an assistance force 106 that changes exponentially as the upper member 20 moves between the compressed position 90 and the contact position 94. The upper magnet 80 may or may not contact the lower magnet 82 while the upper member 20 is in the contact position 94 depending on the distance between the upper member 20 and the lower member 30, the thickness of the upper magnet 80 and the lower magnet 82 and the magnetic field strength of the upper magnet 80 and the lower magnet 82.

E. Connecting Member

A force assistant system may further include at least one connecting member 40 that connects the upper member 20 to the lower member 30. As best shown in FIGS. 10-16, the at least one connecting member 40 may be positioned between the upper member 20 and the lower member 30. The at least one connecting member 40 may be positioned (e.g., like a band, not shown) around the upper member 20 and/or the lower member 30. As the movable arm 12 moves in the upward direction past the contact position 94, the movable arm 12 ceases to press down on (e.g., contact) the upper member 20. The at least one connecting member maintains the upper member 20 connected to the lower member 30 while the movable arm 12 does not contact the upper member 20.

As the upper member 20 moves with respect to the lower member 30, between the compressed position 90 and the contact position 94, the at least one connecting member 40 may guide (e.g., channel, direct) the movement of upper member 20 with respect to lower member 30. While upper member is positioned in the contact position 94, the at least one resilient member 50 may exert some assistance force 106 on the upper member 20. The assistance force 106 provided by the at least one resilient member 50 to the upper member 20 in the contact position 94 cannot be transferred to the movable arm 12 because in the contact position 94, the at least one connecting member 40 holds (e.g., restraints) the upper member 20 in the contact position 94 thereby inhibiting (e.g., stopping) the transfer of the assistance force 106 to the movable arm 12. As the movable arm 12 moves past the contact position 94 toward the lifted position 98, the at least one connecting member 40 holds the upper member 20 in the contact position 94, so the upper member 20 cannot move further away from the lower member 30 or toward the movable arm 12.

As the weight force 100 moves the movable arm 12 in the downward direction from the lifted position 98 toward the upper member 20, the upper member remains held by the at least one connecting member 40 in the contact position 94. When the movable arm 12 comes into contact with the upper member 20, at the contact position 94, the weight force 100 is applied to the upper member 20. If at this point the user is not applying any user force 104 in the upward direction, the weight force 100 pushes the upper member 20 in the downward direction toward the lower member 30. As upper member 20 moves in the downward direction, the at least one connecting member 40 may guide the movement of the upper member 20. The at least one connecting member 40 may guide the movement of the upper member 20 along a length of the at least one connecting member 40.

In an embodiment, the at least one connecting member is comprised of a plurality of bolts. The bolts may be inserted through holes in the upper member 20. The bolts may extend through the holes in the upper member 20 to guide the movement of the upper member 20 as it moves toward lower member 30. The upper member 20 may include recesses 22 so that as the upper member 20 moves with respect to the lower member 30, the ends of the bolts do not extend above the upper surface of the upper member 20.

Figure 13:
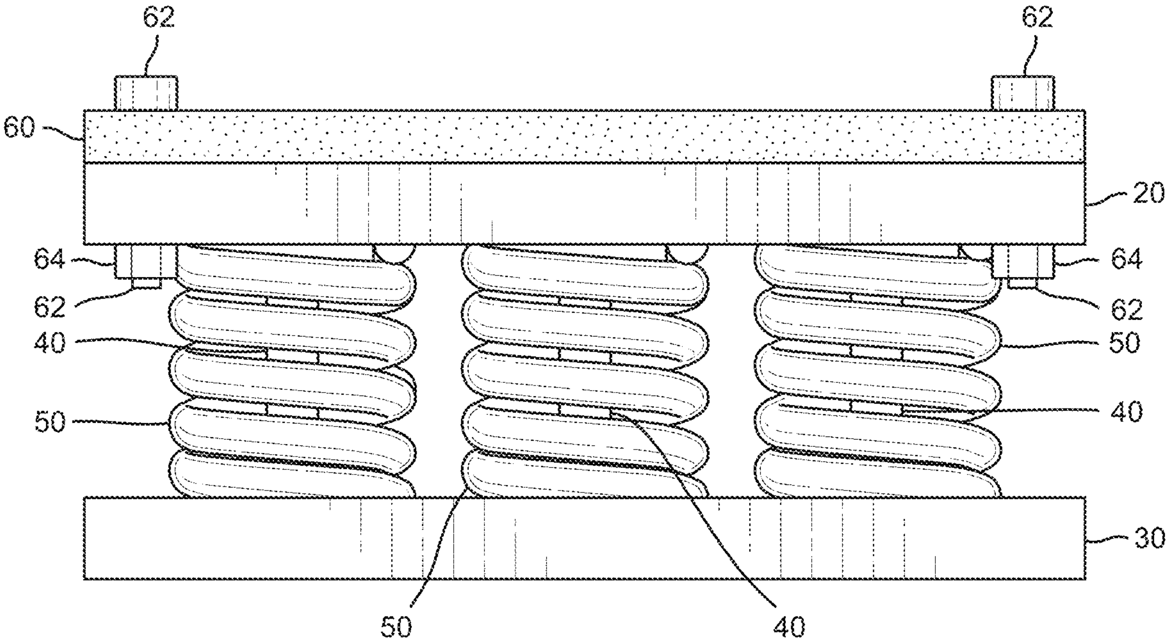
FIG. 13 is a front view of the sample embodiment.

In another embodiment, as best shown in FIGS. 12-14, the at least one connecting member 40 is comprised of the plurality of bolts and is further comprised of a plurality of nuts 42. One nut 42 of the plurality of nuts 42 is coupled to a respective bolt to connect the upper member 20 to the lower member 30. The upper member 20 moves along a length of the plurality of the bolts as the upper member 20 moves relative to the lower member 30. When the movable arm 12 does not contact the upper member 20, the plurality of nuts 42 maintain the upper member 20 connected to the lower member 30.

F. Cushion Member

A force assistant system may further include a cushion member 60. As best shown in FIGS. 1-6, 10-11 and 15-16, the cushion member 60 is positioned between the upper member 20 and the movable arm 12. The cushion member 60 is adapted to cushion contact between the movable arm 12 and the upper member 20.

As discussed above, as a movable arm 12 moves in the upward direction past the contact position 94, the movable arm 12 ceases to contact the upper member 20. The user continues to exert the user force 104 in the upward direction on the movable arm 12 to continue to move the movable arm 12 from the contact position 94 to the lifted position 98. Upon reaching the lifted position 98, the user reduces the user force 104 either significantly or completely to zero. Because the user force 104 no longer pushes against the weight force 100, the weight force 100 may cause the movable arm 12 to move rapidly downward toward the contact position 94. If the movable arm 12 contacts the upper member 20 while moving rapidly in the downward direction, the sudden impact between the movable arm 12 and the upper member 20 may create a loud noise or may cause damage to either the movable arm 12 or the upper member 20. The cushion member 60 absorbs some of the force exerted by the movable arm 12 on contact with the upper member 20 thereby cushioning the upper member 20 and the movable arm 12.

The cushion member 60 may be formed of a resilient material. The resilient material may deform as the movable arm 12 comes into contact with the cushion member 60 to provide a cushion between the movable arm 12 and the upper member 20.

The cushion member 60 may be coupled to an upper surface of the upper member 20. The cushion member 60 may be coupled to the upper member 20 in any manner. In an implementation, the cushion member 60 is coupled to the upper member 20 using bolts 62 and nuts 64. The bolts 62 pass through the holes 24 in the upper member 20 and corresponding holes in the cushion member 60. The nuts 64 secure the bolts 62 in the holes to retain the cushion member 60 in position with respect to the upper member 20.

Figure 10:
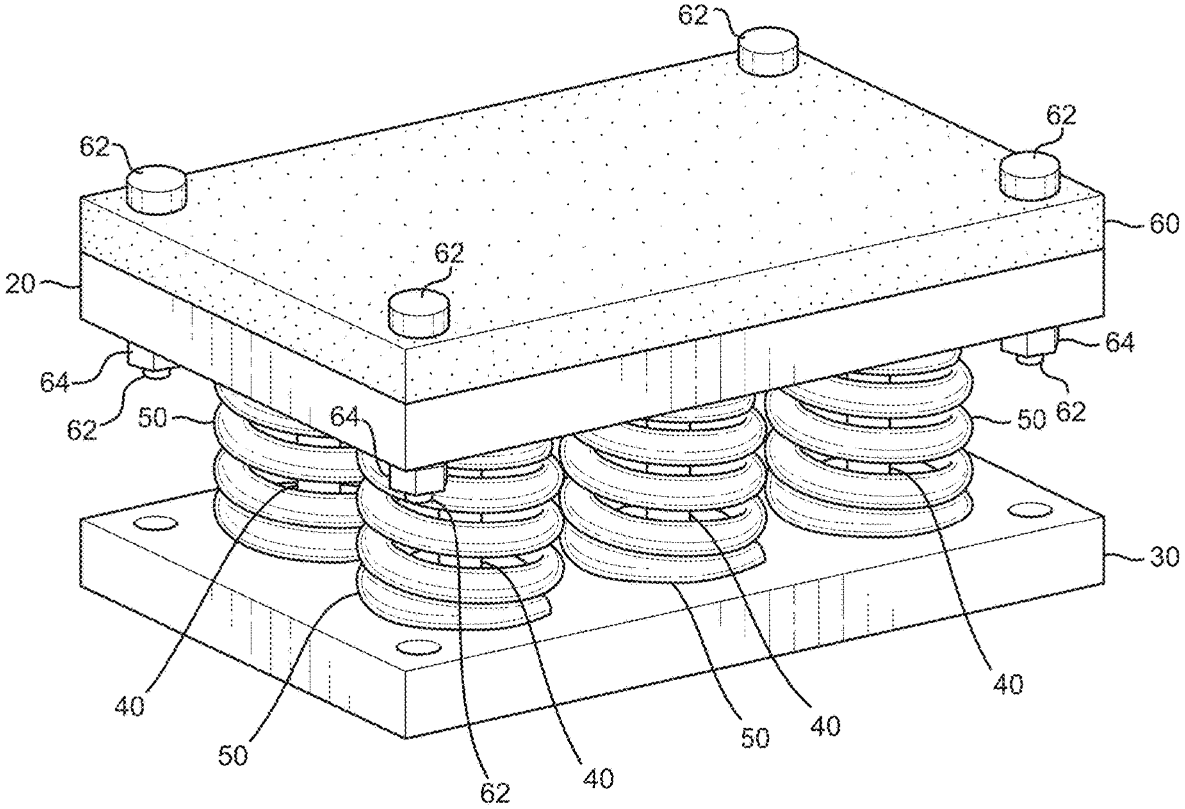
FIG. 10 is a perspective view of a perspective view of the example embodiment.
Figure 11:
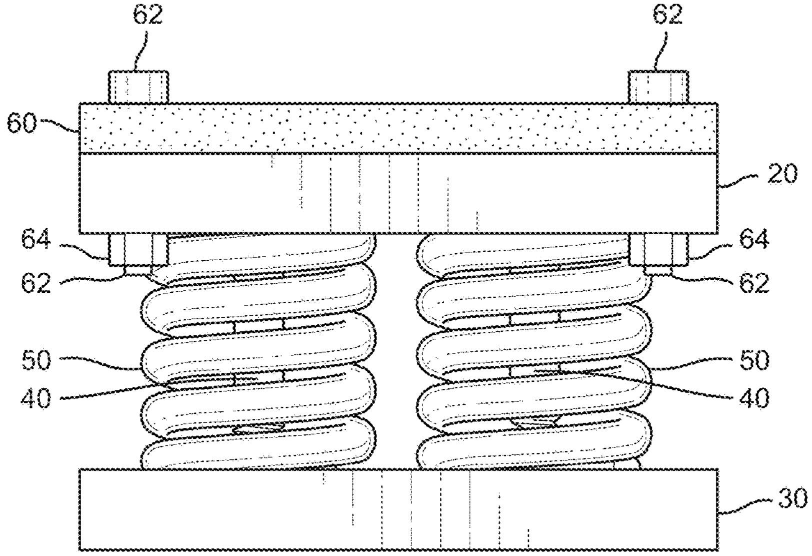
FIG. 11 is a left side view of the example embodiment.

In an implementation, the cushion member 60 comprises a rubber mat. The rubber mat may be of any thickness suitable to provide a cushion between the movable arm 12 and the upper member 20. The rubber mat may be removably coupled to the upper member 20. As best shown in FIGS. 10-11 and 13, the rubber mat may be coupled to the upper member 20 using the bolts 62 and the nuts 64.

G. Constant Assistance Force

The diagram of FIG. 9 shows an assistance force 106 that is constant between the compressed position 90 and the contact position 94. Providing an assistance force 106 that is constant requires varying the force between the upper member 20 and the lower member 30 as the upper member 20 moves with respect to the lower member 30. For example, to maintain the assistance force 106 constant, as the upper member 20 moves away from the lower member 30, the at least one resilient member 50 must maintain the same amount of force on the upper member 20. A resilient member that compresses and decompresses to provide the assistance force 106 likely cannot provide a constant force because as the upper member 20 moves away from the lower member 30, resilient member decompresses thereby providing less force on the upper member 20.

An actuator may provide a constant force regardless of the distance between the upper member 20 in the lower member 30. As discussed above, an actuator in combination with a processor and sensors may provide an assistance force 106 that is constant. The sensors may detect the distance between the upper member 20 and the lower member 30. As the actuator rod of the actuator moves, responsive to the movement of upper member 20 with respect to lower member 30, the sensors may detect the distance and direction of the movement. The sensors may provide the distance and direction information to a processor. The processor may adjust the force provided by the actuator to maintain a constant force over the range of movement between the compressed position 90 and a contact position 94.

H. Operation of Preferred Embodiment

In use, as best shown in FIGS. 1-8, the force assistant system assists a user of an exercise machine 10 by reducing the amount of force needed from the user during a first portion of a lift. Reducing the amount of user force 104 required from the user at the beginning of the lift allows the user to put heavier weights 14 on the movable arm 12 while still being able to move movable arm 12 up to the lifted position 98. The assistance force 106 provided during the beginning portion of the left, enables the user to lift heavier weights to be able to better develop muscles.

At the beginning of a lift, the weight force 100 from the weight 14 and the movable arm 12 presses upper member 20 down into the compressed position 90. In the compressed position 90, the at least one resilient member 50 is compressed and exerts an assistance force 106 in an upward direction on the movable arm 12 via upper member 20. The assistance force 106 alone is not sufficient to move the movable arm 12 to the lifted position 98 or even to the contact position 94. While the upper member 20 is in the compressed position 90, the assistance force 106 applied by the at least one resilient member 50 on the movable arm 12 is the maximum assistance force 108 as shown in FIGS. 7-9.

The user starts the lift by applying the user force 104 to the movable arm in the upward direction. If the sum of the user force 104 and the assistance force 106, identified as the upward force 102 in FIGS. 7-9, is greater than the weight force 100, the movable arm 12 begins to move in the upward direction. As the movable arm 12 moves in the upward direction, the upper member 20 also moves in the upward direction away from the lower member 30. As the upper member 20 moves away from the lower member 30, the at least one resilient member 50 begins to decompress. So, as the upper member 20 moves away from the compressed position 90, the assistance force 106 applied in the upward direction to the movable arm 12 decreases. For example, referring to FIGS. 7-8, as the upper member 20 moves from the compressed position 90 to the intermediate position 92, the assistance force 106 decreases from the maximum assistance force 108 to a lesser amount of force. As the assistance force 106 decreases, the user must increase the user force 104 to keep movable arm 12 moving in the upward direction.

As the movable arm 12 continues to move upward, the upper member 20 continues to move away from the lower member 30 and the at least one resilient member 50 continues to decompress thereby further decreasing the amount of assistance force 106 exerted on the movable arm 12. Again, the upward force 102, which is the sum of the assistance force 106 and the user force 104, must be greater than the weight force 100 if the movable arm 12 is to continue to move upward toward the lifted position 98. So, as the assistance force 106 decreases, the user must increase the user force 104. For example, as best shown in FIGS. 7-8, as the upper member 20 moves from the intermediate position 92 to the contact position 94, the assistance force 106 applied to the movable arm 12 continues to decrease.

As the movable arm 12 continues to move upward from the contact position 94, the movable arm 12 moves away from the upper member 20 and ceases to contact the upper member 20. As the movable arm 12 moves away from the upper member 20, the at least one connecting member 40 retains the upper member 20 connected to the lower member 30. Because the at least one connecting member 40 prohibits further upward movement by the upper member 20, the upper member 20 remains in the contact position 94 and the at least one resilient member 50 ceases to apply the assistance force 106 on the movable arm 12. So, at the contact position 94, the assistance force 106 applied to (e.g., on) the movable arm 12 is zero. Because the assistance force 106 on the movable arm 12 is zero, the user force 104 alone must be greater than the weight force 100 for the movable arm 12 to continue moving toward the lifted position 98.

As described above, and as best shown in FIGS. 7-8, the assistance force 106 reduces the amount of user force 104 required from the user during the first portion (e.g., compressed position 90 to contact position 94) of a lift. The assistance force 106 reduces the amount of user force 104 required from the user to move the movable arm 12 from the compressed position 90 to the contact position 94. During the first portion of the left, the assistance force 106 does some of the lifting thereby reducing the burden on (e.g., assisting) the user. As the movable arm 12 moves past the contact position 94, the user force 104 alone, with no assistance from assistance force 106, must be greater than the weight force 100 to move movable arm 12 from the contact position 94 to the lifted position 98. The position identified as the beyond position 96 represents a position with respect to the movable arm 12 that is beyond the contact position 94. When the movable arm 12 reaches the beyond position 96, the movable arm 12 has moved past the contact position 94. The physical location of the beyond position 96 may coincide with physical position of the contact position 94.

Once the user has moved the movable arm 12 from the contact position 94 to the lifted position 98, the user may significantly decrease user force 104 so that the weight force 100 begins to move the movable arm 12 in a downward direction. As the movable arm 12 moves in the downward direction, the movable arm 12 contacts the upper member 20 at the contact position 94. Upon contact of the movable arm 12 with the upper member 20, the at least one resilient member 50 begins to apply the assistance force 106 in the upward direction on the movable arm 12. Assuming that the sum of the assistance force 106 and the user force 104 is still less than the weight force 100, the weight force 100, via the movable arm 12, presses down on the upper member 20 to begin moving the upper member 20 toward the lower member 30 and from the contact position 94 to the compressed position 90.

As the upper member 20 moves from the contact position 94 to the intermediate position 92, the upper member 20 moves closer to the lower member 30 and compresses the at least one resilient member 50. As the at least one resilient member 50 compresses, it exerts an increased assistance force 106 on the movable arm 12. Still assuming that the sum of the assistance force 106 and the user force 104 is less than the weight force 100, the weight force 100 continues to move the upper member 20 toward the lower member 30.

The movable arm 12 continues to move in the downward direction until the upper member 20 reaches the compressed position 90. In the compressed position 90, the upper member 20 does not move any closer to lower member 30. In an embodiment, the at least one connecting member 40 halts the movement of the upper member 20 toward the lower member 30. In this embodiment, the at least one connecting member 40 establishes the position of the upper member 20 with respect to the lower member 30 in the compressed position 90. In this embodiment, the distance between the upper member 20 and the lower member 30 in the compressed position 90 is the same regardless of the weight force 100.

In another embodiment, the compressed position 90 coincides with the position of upper member 20 with respect to lower member 30 when the assistance force 106 exerted in the upward direction on movable arm 12 is equal to the weight force 100 in the downward direction. In this embodiment, the compressed position occurs when the assistance force 106 completely counteracts the weight force 100 to stop downward movement of the upper member 20 with respect to the lower member 30. In this embodiment, the distance between the upper member 20 and the lower member 30 may vary depending on the weight force 100.

While the upper member 20 is positioned in the compressed position 90, the at least one resilient member 50 exerts the maximum assistance force 108 on the movable arm 12.

In an embodiment, the force assistance system for an exercise machine includes the exercise machine 10, a lower member 30, and upper member 20, at least one connecting member 40 and at least one resilient member 50. The exercise machine includes a movable arm 12 and a frame 16. The lower member 30 is adapted to rest on the frame 16. The upper member 20 is adapted to contact the movable arm 12. The at least one connecting member 40 connects the upper member 20 to the lower member 30. The at least one resilient member 50 is positioned between the upper member 20 and the lower member 30. The lower member 30, the upper member 20, the at least one connecting member and the at least one resilient member 50 are adapted to be positioned between the frame 16 and the movable arm 12. As the movable arm 12 pushes the upper member 20 in a downward direction, the at least one resilient member 50 applies an assistance force 106 to the movable arm 12 in an upward direction. The assistance force 106 in combination with a user force 104 moves the movable arm 12 in the upward direction. The assistance force 106 reduces the user force 104 required to move the movable arm 12 in the upward direction.

Unless otherwise defined, all technical and scientific terms used herein have the same meaning as commonly understood by one of ordinary skill in the art to which this invention belongs. Although methods and materials similar to or equivalent to those described herein can be used in the practice or testing of the force assistance system for an exercise machine 10, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The force assistance system for an exercise machine 10 may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A force assistance system for an exercise machine, the force assistance system comprising:

a lower member adapted to rest on a frame of the exercise machine;

an upper member adapted to contact a movable arm of the exercise machine;

at least one resilient member positioned between the upper member and the lower member; and at least one connecting member that connects the upper member to the lower member, wherein the at least one connecting member is comprised of at least one shaft, wherein the upper member moves along a length of the at least one shaft as the upper member moves relative to the lower member, wherein the lower member, the upper member and the at least one resilient member are adapted to be positioned between the frame and the movable arm, such that when the movable arm pushes the upper member in a downward direction, the upper member moves relative to the lower member and the at least one resilient member applies an assistance force to the movable arm in an upward direction, wherein the assistance force in combination with a user force moves the movable arm in the upward direction, whereby the assistance force reduces the user force required to move the movable arm in the upward direction, wherein as the movable arm moves in the upward direction past a contact position with the upper member, the movable arm ceases to contact the upper member and the at least one resilient member ceases to apply the assistance force on the movable arm.

2. The force assistance system of claim 1, wherein the at least one connecting member maintains the upper member connected to the lower member when the movable arm does not contact the upper member.

3. The force assistance system of claim 2, wherein the at least one connecting member is comprised of a plurality of bolts.

4. The force assistance system of claim 3, wherein the at least one connecting member is further comprised of a plurality of nuts, wherein one nut of the plurality of nuts is coupled to a respective bolt to connect the upper member to the lower member, wherein the upper member moves along a length of the plurality of bolts as the upper member moves relative to the lower member, and wherein when the movable arm does not contact the upper member, the plurality of nuts maintain the upper member connected to the lower member.

5. The force assistance system of claim 1, wherein while the movable arm contacts the upper member and moves in the upward direction, the upper member moves in the upward direction with respect to the lower member to decompress the at least one resilient member.

6. The force assistance system of claim 1, wherein as the movable arm moves in the downward direction, the movable arm pushes the upper member in the downward direction with respect to the lower member to compress the at least one resilient member.

7. The force assistance system of claim 6, wherein as the movable arm pushes the upper member in the downward direction, the assistance force applied by the at least one resilient member on the movable arm is increased.

8. The force assistance system of claim 7, wherein as the movable arm pushes the upper member in the downward direction, the movable arm reaches a compressed position in which the assistance force is a maximum.

9. The force assistance system of claim 1, wherein the assistance force applied by the at least one resilient member on the movable arm is proportional to a distance traveled by the upper member between a contact position, in which the movable arm begins to contact the upper member, and a compressed position, in which the upper member is positioned at a position closest to the lower member.

10. The force assistance system of claim 1, wherein the at least one resilient member comprises a spring.

11. The force assistance system of claim 1, wherein the at least one resilient member comprises an actuator.

12. The force assistance system of claim 1, wherein the at least one resilient member comprises an upper magnet having a first side with a first polarity and a lower magnet having a second side with a second polarity, wherein the upper magnet is coupled to the upper member with the first side oriented toward the lower member and the lower magnet is coupled to the lower member with the second side oriented toward the upper member, wherein the first polarity is a same as the second polarity whereby a repulsion force between the upper magnet and the lower magnet provides the assistance force.

13. The force assistance system of claim 1, wherein the assistance force is a linear force.

14. The force assistance system of claim 1, wherein the assistance force is a non-linear force.

15. The force assistance system of claim 1, further comprising a cushion member positioned between the upper member and the movable arm, wherein the cushion member is adapted to cushion contact between the movable arm and the upper member.

16. The force assistance system of claim 15, wherein the cushion member comprises a rubber mat.

17. The force assistance system of claim 1, wherein the at least one resilient member is comprised of a plurality of actuators, wherein an actuator rod of each actuator respectively couples to one of the upper member and the lower member.

18. An exercise machine system, comprising:

an exercise machine having a movable arm and a frame; and a force assistance system, the force assistance system comprising:

a lower member adapted to rest on the frame of the exercise machine;

an upper member adapted to contact the movable arm of the exercise machine;

at least one resilient member positioned between the upper member and the lower member; and at least one connecting member that connects the upper member to the lower member, wherein the at least one connecting member is comprised of at least one shaft, wherein the upper member moves along a length of the at least one shaft as the upper member moves relative to the lower member, wherein the lower member, the upper member and the at least one resilient member are adapted to be positioned between the frame and the movable arm, such that when the movable arm pushes the upper member in a downward direction, the upper member moves relative to the lower member and the at least one resilient member applies an assistance force to the movable arm in an upward direction, wherein the assistance force in combination with a user force moves the movable arm in the upward direction, whereby the assistance force reduces the user force required to move the movable arm in the upward direction, wherein as the movable arm moves in the upward direction past a contact position with the upper member, the movable arm ceases to contact the upper member and the at least one resilient member ceases to apply the assistance force on the movable arm.

19. A force assistance system for an exercise machine, the force assistance system comprising:

a lower member adapted to rest on a frame of the exercise machine;

an upper member adapted to contact a movable arm of the exercise machine;

a cushion member positioned between the upper member and the movable arm, wherein the cushion member is adapted to cushion contact between the movable arm and the upper member;

at least one resilient member positioned between the upper member and the lower member; and at least one connecting member that connects the upper member to the lower member, wherein the at least one connecting member is comprised of at least one shaft, wherein the upper member moves along a length of the at least one shaft as the upper member moves relative to the lower member, wherein the lower member, the upper member and the at least one resilient member are adapted to be positioned between the frame and the movable arm, such that when the movable arm pushes the upper member in a downward direction, the upper member moves relative to the lower member and the at least one resilient member applies an assistance force to the movable arm in an upward direction, wherein the assistance force in combination with a user force moves the movable arm in the upward direction, whereby the assistance force reduces the user force required to move the movable arm in the upward direction, wherein as the movable arm moves in the upward direction past a contact position with the upper member, the movable arm ceases to contact the upper member and the at least one resilient member ceases to apply the assistance force on the movable arm;

wherein the at least one connecting member maintains the upper member connected to the lower member when the movable arm does not contact the upper member;

wherein while the movable arm contacts the upper member and moves in the upward direction, the upper member moves in the upward direction with respect to the lower member to decompress the at least one resilient member;

wherein as the movable arm moves in the downward direction, the movable arm pushes the upper member in the downward direction with respect to the lower member to compress the at least one resilient member;

wherein as the movable arm pushes the upper member in the downward direction, the assistance force applied by the at least one resilient member on the movable arm is increased.

20. The force assistance system of claim 19, wherein the cushion member comprises a rubber mat.

* * * * *